(12) United States Patent
Thompson et al.

(10) Patent No.: US 6,491,124 B1
(45) Date of Patent: Dec. 10, 2002

(54) SEATING SYSTEM CONFIGURABLE BETWEEN ONE-PERSON TO TWO-PERSON CONFIGURATIONS, AND METHODS FOR CONFIGURING THE SAME

(75) Inventors: David Charles Thompson, Thief River Falls, MN (US); Rhonda Lynnette Martinsen, Thief River Falls, MN (US); Jack Thomas Nelson, Thief River Falls, MN (US)

(73) Assignee: Arctic Cat., Inc., Thief River Falls, MN (US)

( * ) Notice: Subject to any disclaimer, the term of this patent is extended or adjusted under 35 U.S.C. 154(b) by 0 days.

(21) Appl. No.: 09/579,614

(22) Filed: May 26, 2000

(51) Int. Cl.$^7$ .............................................. B62M 27/02
(52) U.S. Cl. .................................. 180/190; 297/215.12
(58) Field of Search .............................. 297/383, 195.1, 297/353, 215.12, 243, 188.01, 188.2, 188.21, 440.22, 354.11, 354.12, 440.1; 180/190; 280/12.11

(56) References Cited

U.S. PATENT DOCUMENTS

| | | | | |
|---|---|---|---|---|
| 3,785,541 A | * | 1/1974 | Sibley | |
| 4,313,639 A | * | 2/1982 | Ware | |
| 4,466,660 A | * | 8/1984 | Mabie | |
| 4,779,695 A | * | 10/1988 | Yasui | |
| 4,893,692 A | * | 1/1990 | Smith | |
| 5,026,119 A | * | 6/1991 | Frank et al. | |
| 5,441,330 A | * | 8/1995 | Rojas | |
| 5,558,260 A | * | 9/1996 | Reichert | |
| 5,697,671 A | * | 12/1997 | Shavitz | |
| 5,964,172 A | * | 10/1999 | Ikeda | |

OTHER PUBLICATIONS

"Arctic Cat 1992", marked p. 17, *Pantera*, and marked p. 19, *Cheetah Touring*, 1992.
"The Arctic Catalog", genuine parts & accessories, marked pp. 45, and 47, 1993.

\* cited by examiner

Primary Examiner—Milton Nelson, Jr.
(74) Attorney, Agent, or Firm—Merchant & Gould, P.C.

(57) ABSTRACT

A seating system configurable between a one-person and a two-person configuration, comprising a bed with front and rear portions, a bench with front and rear portions, and a backrest. The backrest is moveable between a first position immediately aft of the front bench portion whereby the seating system is in the one-person configuration, and a second position immediately aft of the rear bench portion whereby the seating system is in the two-person configuration. The rear bench portion is removable, and the seating system may be fitted with a cargo carrier in place of the rear bench portion.

13 Claims, 3 Drawing Sheets

SEATING SYSTEM CONFIGURABLE BETWEEN ONE-PERSON TO TWO-PERSON CONFIGURATIONS, AND METHODS FOR CONFIGURING THE SAME

FIELD OF THE INVENTION

This invention relates to a seating system suitable for use with a vehicle, and more particularly to a seating system that is configurable between a one-person configuration suitable for supporting one person, and a two-person configuration suitable for supporting two persons.

BACKGROUND OF THE INVENTION

Seating systems for supporting people in a sitting position on a vehicle such as a snowmobile are well-known. Most vehicles include seating systems of some sort. Vehicle seating systems commonly comprise a generally horizontal bench portion secured to a supporting bed structure, and often include a generally vertical backrest immediately aft of the bench for additional comfort.

Conventional vehicle seating systems generally hold a fixed number of people. Most commonly, a vehicle seat supports only a single person. However, vehicle seats that support two people are also known. Typically, two-person seating systems are designed with an elongated bench portion so as to support one person in front of the other. Such seats typically have a backrest only for the person in the rear position, so that the person in the front position must rely on the person in the rear position for back support.

It is desirable to have the option of supporting two people on a single seat, especially in a relatively small vehicle where space and weight capacity are limited, for example a snowmobile. However, a vehicle with a conventional two-person seating system may be uncomfortable, inconvenient, or even dangerous for a single person to operate, due to the greater length of the bench and the absence of a properly positioned backrest. Furthermore, when a single person occupies a two-person seat, the excess space is wasted, as it is difficult to adapt a seat for other purposes, for example cargo space.

It is known to produce multiple seating systems for a single vehicle, for example a one-person seat and a two person seat, and to exchange seats when necessary. However, removing and replacing a seat is commonly a difficult and time-consuming operation, requiring tools and at least some mechanical expertise.

SUMMARY OF THE INVENTION

Therefore it is the general purpose of the present invention to overcome the deficiencies of the existing designs. It is the purpose of the present invention to provide a seating system suitable for use with a vehicle that is configurable between a one-person and a two-person configuration. It is preferable that the seating system be configurable quickly and conveniently. It is also preferable that, when the seating system is in the one-person configuration, the space otherwise required for supporting a second person is available for other purposes, such as cargo.

An embodiment of the present invention comprises a bed with front and rear portions, a bench with front and rear portions disposed on the bed, and a backrest disposed on the bench. The seating system is configurable between a one-person configuration suitable for supporting one person, and a two-person configuration suitable for supporting two persons. It is preferable that the backrest is moveable between a first position immediately aft of the rear bench portion, whereby the seating system is in the two-person configuration, and a second position immediately aft of the front bench portion, whereby the seating system is in the one-person configuration.

It is also preferable that the rear portion of the bench be removable when the seating system is in the one-person configuration. It is more preferable that the rear bed portion is suitable for accepting a cargo carrier when the rear bench portion is removed.

A variety of additional advantages of the invention will be set forth in part in the description which follows, and in part will be obvious from the description, or may be learned by practice of the invention. The advantages of the inventions will be realized and attained by means of the elements and combinations particularly pointed out in the claims. It is to be understood that both the foregoing general description and the following detailed description are exemplary and explanatory only and are not restrictive of the invention as claimed.

BRIEF DESCRIPTION OF THE DRAWINGS

Like reference numbers generally indicate corresponding elements in the figures.

DETAILED DESCRIPTION OF THE PREFERRED EMBODIMENTS

Figure 1:
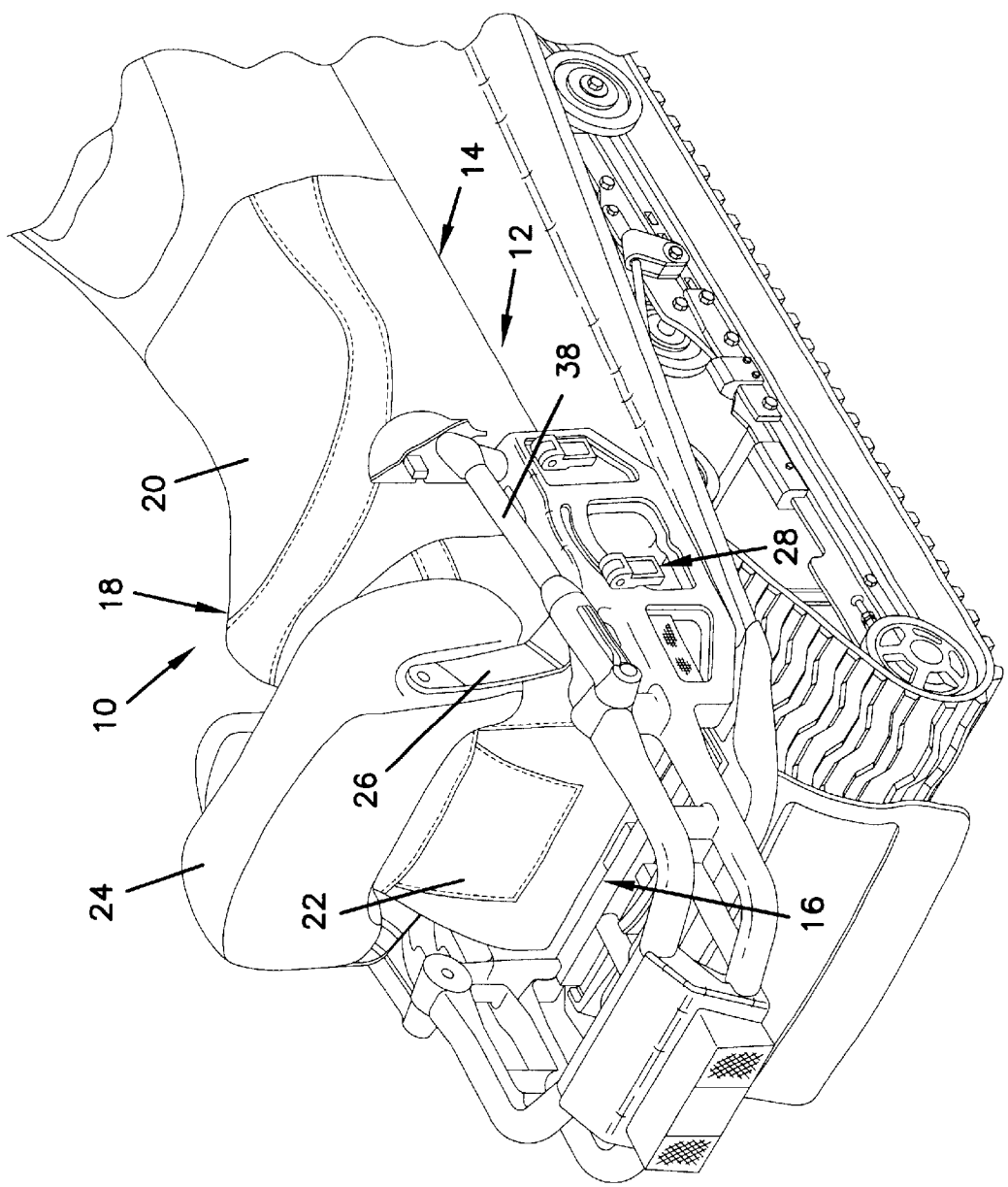
FIG. 1 is a perspective view of an embodiment of a seating system in accordance with the principles of the present invention, wherein the seating system is in a two-person configuration.

Referring to FIG. 1, the present invention comprises a seating system 10 suitable for use with a vehicle. The seating system 10 comprises a bed 12 having front and rear bed portions 14 and 16, a bench 18 having front and rear bench portions 20 and 22, and a backrest 24. The bed 12 is preferably but not necessarily integral with the vehicle. As illustrated, the bed 12 is the tunnel body of a snowmobile. However, it will be apparent to those knowledgeable in the art that the present invention may be suitable for use with other beds and on other vehicles, including but not limited to personal watercraft, etc. The present invention is applicable to a wide variety of possible beds, benches, and backrests. These generally are well-known, and are not described in detail herein.

Figure 2:
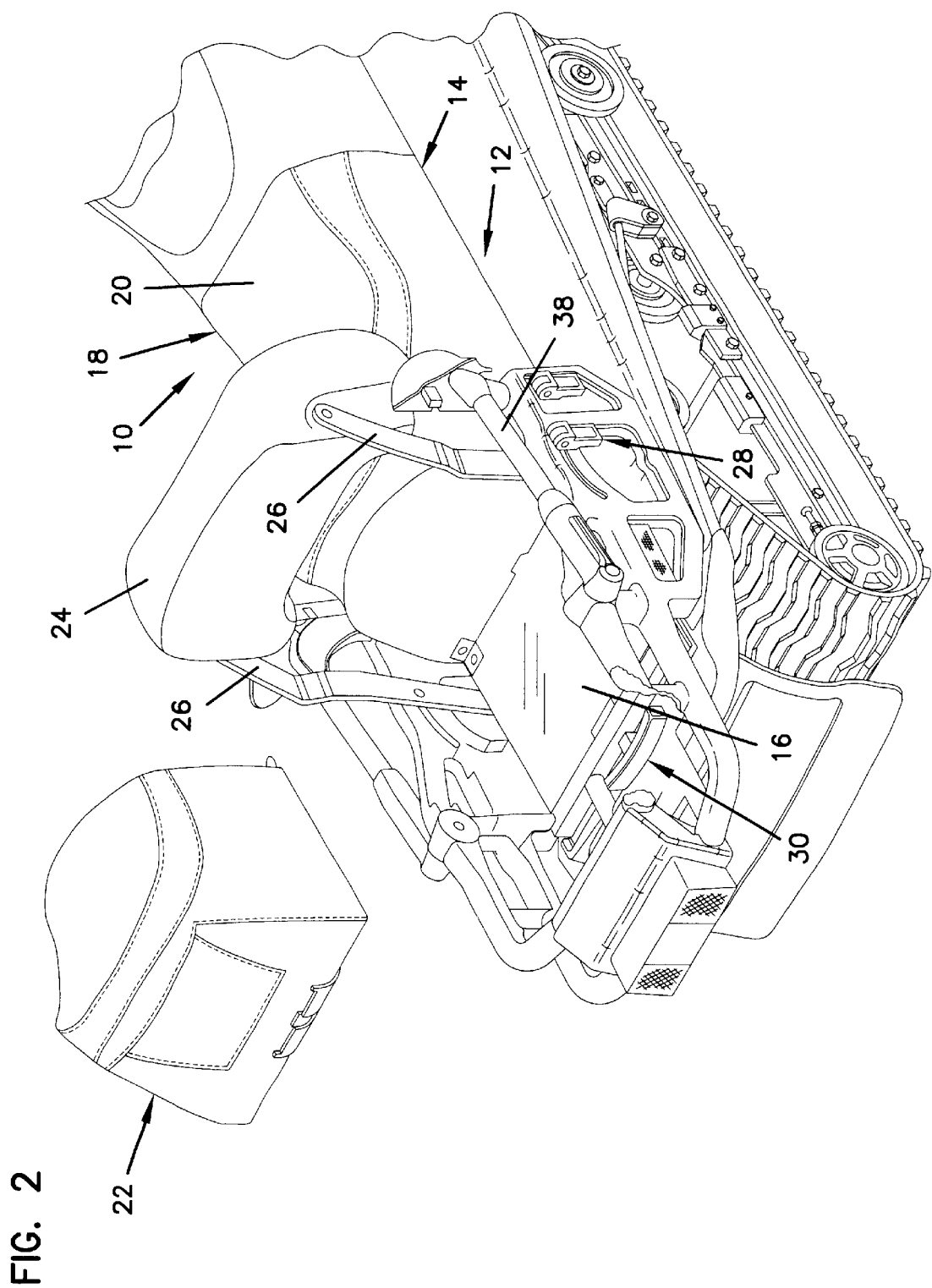
FIG. 2 is a perspective view of an embodiment of a seating system in accordance with the principles of the present invention, wherein the seating system is in a one-person configuration, and wherein the rear bench portion of the seating system is removed.

The seating system 10 is configurable between a one-person configuration suitable for supporting one person, as shown in FIG. 2, and a two-person configuration suitable for support two persons, as shown in FIG. 1.

In an embodiment of the invention, the backrest 24 is moveable between a first position immediately aft of the front bench portion 20, as shown in FIG. 2, and a second position immediately aft of the rear bench portion 22, as shown in FIG. 1. In this embodiment, when the backrest 24 is in the first position the seating system 10 is in the one-person configuration, and when the backrest 24 is in the second position the seating system 10 is in the two-person configuration.

It is preferable that the seating system 10 comprise a backrest engaging system 26 for mechanically engaging the backrest 24 with the bed 12. As shown in FIG. 1, the backrest engaging system 26 can include at least one arm 27 pivotably engaged with the backrest 24 and the rear bed portion 14. As shown in FIG. 1, the backrest engaging system 26 comprises a pair of arms, however, this arrangement is exemplary only. As may be seen from FIGS. 1–3, the arm 27 is pivotable with respect to both the bed 12 and the backrest 24. Such an arrangement permits simple construction of the seating system as well as easy adjustment between the one-person and two-person configurations. In addition, this arrangement enables the backrest 24 to retain the same orientation with respect to the bench 18. Thus, the backrest remains in a comfortable orientation regardless of whether the seating system 10 is in the one-person or the two-person configuration. However, it will be apparent to those knowledgeable in the art that this design is exemplary only, and that other means of engagement may be equally suitable.

It is preferable that the seating system 10 comprise a seat locking system 28 for locking the seating system in place in the one-person and two-person configurations. As shown in FIG. 1, the seat locking system 28 can comprise a cam lock 29 that is carried by the pivoting arms in a slot formed in the bed 14 and is capable of clamping against the bed. Such a mechanism is easily secured and released without tools. However, it will be apparent to those knowledgeable in the art that this design is exemplary only, and that other means for locking the seating system in a particular configuration may be equally suitable.

It is preferable that the rear bench portion 22 be removable from the rear bed portion 16, so that when the seating system 10 is in the one-person configuration the unused rear bench portion 22 need not be carried. It is more preferable that the seating system 10 comprise a releasable bench locking system 30 to releasably secure the rear bench portion 22 to the rear bed portion 16. As shown in FIG. 2, the bench locking system 30 can comprise a latch with a pull handle release mechanism. Such a mechanism is easily secured and released without tools. However, it will be apparent to those knowledgeable in the art that this design is exemplary only, and that other means for retaining the rear bench portion on the rear bed portion may be equally suitable.

Figure 3:
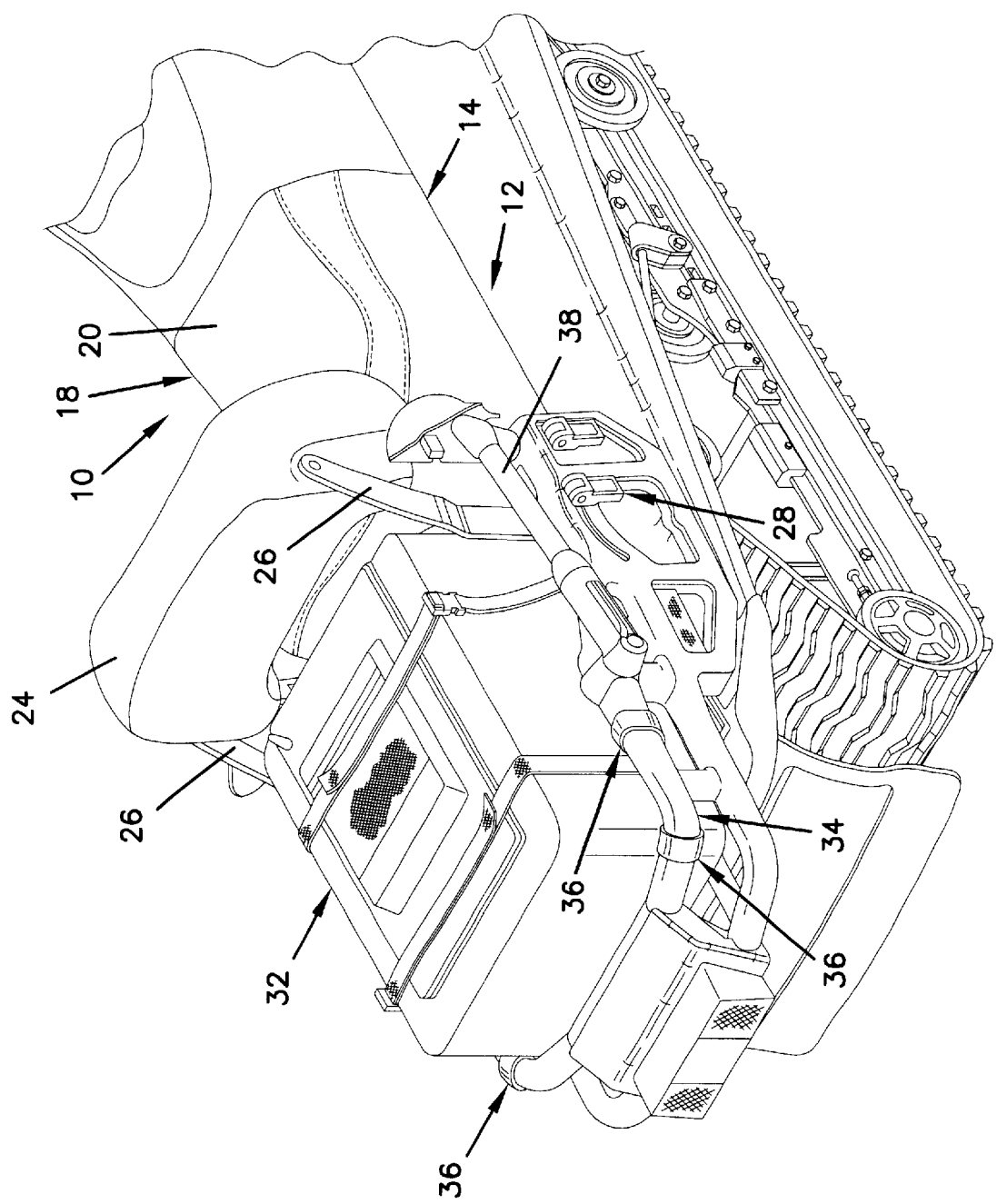
FIG. 3 is a perspective view of an embodiment of a seating system in accordance with the principles of the present invention, wherein the seating system is in a one-person configuration, and wherein a cargo carrier is disposed on the rear bed portion of the seating system.

It is preferable that the rear bed portion 16 be suitable for accepting a cargo carrier 32 when the rear bench portion 22 is absent. Thereby, when the seating system 10 is in the one-person configuration, the space otherwise occupied by the rear bench portion 22 may be used to carry additional cargo. It is more preferable that the seating system 10 comprise a first cargo retaining system 34 suitable for releasably engaging the cargo carrier 32 with the rear bed portion 16. It is still more preferable that the cargo carrier 32 comprise a second cargo retaining system 36 for engaging the first cargo retaining system 34. As shown in FIG. 3, the first cargo retaining system 34 can comprise bars, and the second cargo retaining system 36 can comprise straps suitable for wrapping about the bars. It is further envisioned that the straps may be equipped with hook-and-loop closures, for example. Such an arrangement allows for a variety of possible cargo carriers 32 to be secured, and provides points of attachments for ropes and so forth to secure large or unwieldy cargoes and cargoes not in a cargo carrier 32. This arrangement also permits a cargo carrier 32 to be easily secured and released without tools. However, it will be apparent to those knowledgeable in the art that this design is exemplary only, and that other means for retaining the cargo carrier on the rear bed portion may be equally suitable.

It is preferable that the seating system 10 comprise a hand hold 38 suitable for being gripped by a passenger. As shown in FIG. 1, the hand hold 38 can comprise a generally horizontal bar. It is preferable that the hand hold 38 be adjustable in height, so as to permit comfortable use by persons of varying stature. However, it will be apparent to those knowledgeable in the art that this configuration is exemplary only, and that other hand holds may be equally suitable.

It is to be understood that while certain embodiments of the present invention have been illustrated and described, the invention is not limited to the specific forms or arrangements of the parts described and shown, and that the specification and depicted embodiment is to be considered exemplary only, with the true scope and spirit of the invention being indicated by the broad meaning of the following claims.

We claim:

1. A snowmobile comprising a seating system, said seating system comprising:

a bed, comprising front and rear portions;

a bench disposed on said bed, said bench comprising front and rear portions;

a backrest;

at least one arm connected to said bed and said backrest;

wherein said at least one arm is pivotable with respect to said bed such that said seating system is configurable between a one-person configuration suitable for supporting one person, and a two-person configuration suitable for supporting two persons;

said backrest is pivotable with respect to said at least one arm such that said backrest has an orientation relative to said bench when said seating system is in said one-person configuration that is substantially the same as an orientation relative to said bench when said seating system is in said two-person configuration; and said rear bench portion is removable from said rear bed portion.

2. The snowmobile of claim 1, wherein said rear bed portion is suitable for accepting a cargo carrier, when said rear bench portion is removed.

3. The snowmobile of claim 2, further comprising a cargo carrier to be disposed on said rear bench portion.

4. Th e snowmobile of claim 3, wherein said cargo carrier comprises a second cargo retaining system for releasably retaining said cargo carrier on said rear bed portion.

5. The snowmobile of claim 4, wherein said second cargo retaining system comprise a plurality of straps.

6. The snowmobile of claim 5, wherein said straps comprise hook-and-loop closures.

7. The snowmobile of claim 1, wherein said backrest is moveable between a first position immediately aft of said front bench portion whereby said seating system is in said one-person configuration, and a second position immediately aft of said rear bench portion whereby said seating system is in said two-person configuration.

8. The snowmobile of claim 7, further comprising a seat locking system for locking said seating system in said one and two-person configurations.

9. The snowmobile of claim 8, wherein said seat locking system comprises at least one cam lock.

10. The snowmobile of claim 9, further comprising a bench locking system for releasably retaining said rear bench portion on said rear bed portion.

11. The snowmobile of claim 10, wherein said bench locking system comprises a pull handle for releasing said bench retaining means.

12. The snowmobile of claim 11, wherein said seating system comprises a first cargo retaining system for releasably retaining said cargo carrier on said rear bed portion.

13. The snowmobile of claim 12, wherein said first cargo retaining system comprises at least one bar affixed to said bed portion.

* * * * *